United States Patent [19]

Sugita et al.

[11] Patent Number: 4,609,858
[45] Date of Patent: Sep. 2, 1986

[54] METHOD AND APPARATUS FOR AUTOMATIC RUNNING CONTROL OF A LOOM

[75] Inventors: Katsuhiko Sugita; Toshiyuki Sakano, both of Ishikawa, Japan

[73] Assignee: Tsudakoma Kogyo Kabushiki Kaisha, Japan

[21] Appl. No.: 642,522

[22] Filed: Aug. 20, 1984

Related U.S. Application Data

[63] Continuation-in-part of Ser. No. 354,726, Mar. 4, 1982, abandoned.

[51] Int. Cl.⁴ .................. H02P 1/32; D03D 51/00
[52] U.S. Cl. .................... 318/778; 139/1 E; 318/771
[58] Field of Search ........ 139/1 E; 318/771, 778–780, 318/431

[56] References Cited

U.S. PATENT DOCUMENTS

| | | | |
|---|---|---|---|
| 926,243 | 9/1909 | Clary | 318/780 |
| 1,571,152 | 1/1926 | Whittingham | 318/771 |
| 1,851,716 | 3/1932 | McLenegan | 318/431 |
| 1,902,444 | 3/1933 | Hobart et al. | 318/771 |
| 1,927,208 | 9/1933 | Gay | 318/771 |
| 2,377,726 | 6/1945 | Stapleton | 318/771 |
| 2,583,299 | 1/1952 | Lloyd et al. | 318/780 |
| 2,709,775 | 5/1955 | Del Carlo | 318/771 |
| 2,785,511 | 3/1957 | Wilson | 318/771 |
| 2,858,855 | 11/1958 | Picanol | 139/1 E |
| 2,888,044 | 5/1959 | Picanol | 139/1 E |
| 3,435,854 | 4/1969 | Svaty et al. | 139/1 E |
| 3,624,471 | 11/1971 | Japp et al. | 318/771 |
| 4,413,218 | 11/1983 | Taylor et al. | 318/778 |

Primary Examiner—David Smith, Jr.
Attorney, Agent, or Firm—Lerner, David, Littenberg, Krumholz & Mentlik

[57] ABSTRACT

A voltage to be applied to the primary winding of a drive motor is automatically and time-functionally adjusted in relation to the rated voltage of the drive motor in order to provide sufficiently large torque for beating during the starting period of the loom running and transit to normal running of the loom is carried out at a preselected moment other than the moment of beating motion. Change in voltage is effected through either switching in mode of connection for the primary winding or transforming the power source voltage which is maintained constant.

12 Claims, 8 Drawing Figures

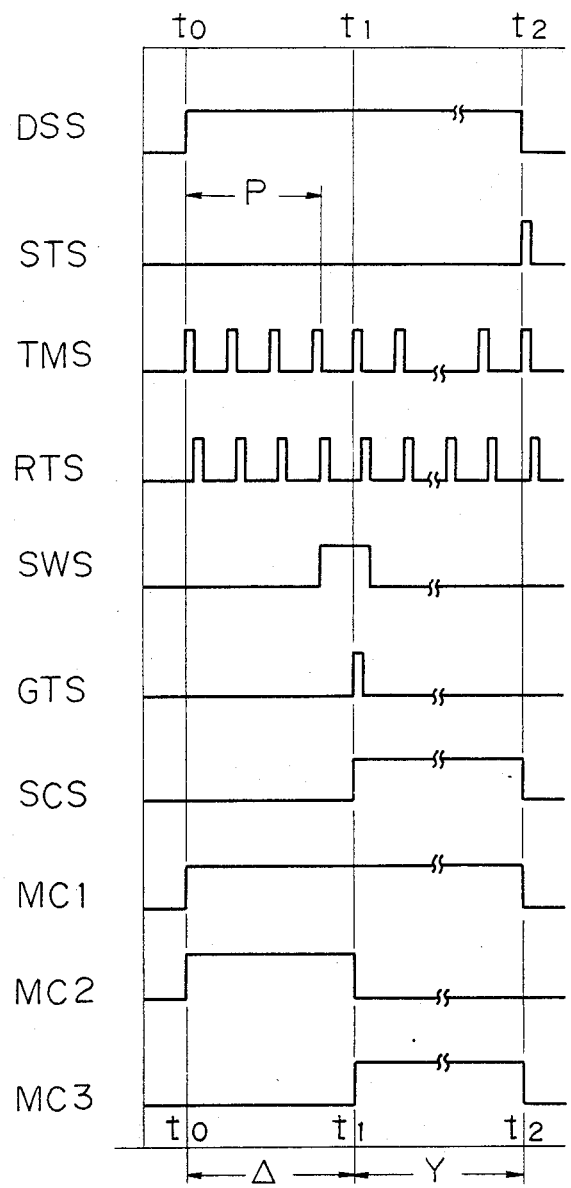

METHOD AND APPARATUS FOR AUTOMATIC RUNNING CONTROL OF A LOOM

This is a continuation-in-part application of the co-pending patent application Ser. No. 354,726 entitled "Method and apparatus for running control of a loom" and filed on Mar. 4, 1982 now abandoned.

BACKGROUND OF THE INVENTION

The present invention relates to method and apparatus for automatic running control of a loom, and more particularly relates to an improvement in an automatic system for controlling the level of electric voltage to be applied to a drive motor for a loom during the starting period of loom running and at transit to normal running.

For various reasons, the level of electric voltage to be applied to a drive motor has to be time-functionally controlled properly in particular during the starting period of loom running. Such voltage level control is necessitated mainly from the viewpoint of stripe defect protection. The stripe defects herein referred to includes thick and thin places extending in the weft direction of a woven fabric. Such stripe defects are in general generated by improper beating on the cloth-fell.

First, such improper beating is resulted from the state of yarns during stoppage of the loom. When the loom is at stoppage, condition of the yarns is quite different from that during normal running because of slack or tension appearing on the yarns. When running of the loom is started and directly brought to normal running condition, a stripe defect is generated on the fabric at the startng position. The type of stripe defect of this sort varies from fabric to fabric. When some slack appears on the yarns during stoppage of the loom, torque provided ordinarily by the drive motor at starting is in general too small to assure sufficient beating on the cloth-fell and, as a consequence, a thin place is developed on the fabric. When some tension appears on the yarns during stoppage of the loom, torque provided ordinarily by the drive motor at starting is in general too large to assure moderate beating on the cloth-fell and, as a consequence, a thick place is developed on the fabric.

Second, such improper beating is resulted from the starting characteristics of the drive motor itself. For provision of large torque at starting of loom running, use of a motor with large starting torque such as a double squirrel cage induction motor is generally employed. Use of such a drive motor indeed assure proper beating motion during the starting period of loom running on the one hand. A drive motor of this type, however, is on the other hand very poor in its running characteristics during normal running period of the loom and, as a consequence, requires increased power consumption with low efficiency. Recent trend for higher speed running of a loom furthers the need for use of a drive motor providable of larger starting torque.

It is well known by ones skilled in the art that an electric device generally exhibits the highest efficiency when driven for operation under application of its rated voltage which also causes minimum operational troubles. Thus, continuous application of a voltage higher than the rated voltage to a drive motor tends to lower the efficiency and cause operational troubles such as burning of its windings.

In order to avoid such inconveniency, it was already proposed by the inventors of the present invention to limit application of such a higher voltage to the starting period of loom running only and to change the voltage to the rated voltage after the starting period. This proposal well suffices both the requirements for large torque during the starting period and the requirement for higher efficiency during the normal running period.

At transit from the higher voltage to the rated voltage, momentary disappearance of voltage acting on the drive motor occurs unavoidably. If such disappearance of voltage takes place at the very moment of beating on the cloth-fell, fall in torque provided by the drive motor develops thin place on the fabric.

SUMMARY OF THE INVENTION

It is the primary object of the present invention to prevent development of stripe defects during starting period of loom running without impairing the running characteristics of a drive motor during normal running period.

It is another object of the present invention to prevent development of stripe defects at transit from the starting period to the normal running period of a loom.

In accordance with the basic aspect of the present invention, a voltage higher than the rated voltage is applied to the primary winding of a drive motor for a loom during the starting period of loom running and the voltage is changed to the rated voltage after the starting period at a moment other than the moment of beating on the cloth-fell.

BRIEF DESCRIPTION OF THE DRAWINGS

FIG. 2 is a graph for showing the states of signals processed in the apparatus shown in FIG. 1, FIGS. 3A and 3B are circuit diagrams for showing the operation of the apparatus shown in FIG. 1.

DESCRIPTION OF THE PREFERRED EMBODIMENTS.

As described already, the voltage to be applied to the primary winding of a drive motor for a loom is time-functionally adjusted in accordance with the basic aspect of the present invention. This time-functional voltage adjustment is carried out on the basis of the following analysis.

The torque T to be provided by a drive motor is in general defined by the following equation;

$$T = (m \cdot E \cdot I \cdot \cos \theta \cdot P / 4\pi f \cdot 9 \cdot 8)$$

m: constant
E: secondary voltage
I: secondary current
P: number of poles
f: electric power source frequence
$\theta$: phase angle between magnetic flux and current.

This equation indicates the fact that the torque T provided by a drive motor is equal to the quotient obtained by dividing its secondary elecric power by its synchronizing angular velocity. The primary voltage, i.e. the voltage applied to the primary winding, of the drive motor is proportional to the secondary voltage and current. Consequently, the torque T provided by the drive motor is proportional to the square of its primary voltage.

As is well known by ones skilled in the art, a delta connection for the primary winding of a drive motor provides higher primary voltage than that by a star connection, and such a higher voltage for the primary winding makes the output torque of the drive motor from 2 to 9 times larger than that with the star connection, if other factors are unchanged. In other words, stronger beating motion is provided on application of higher primary voltage. Further, even without change in connection for the primary winding, increase in voltage from the electric power source causes generation of larger output torque by the drive motor.

Figure 1:
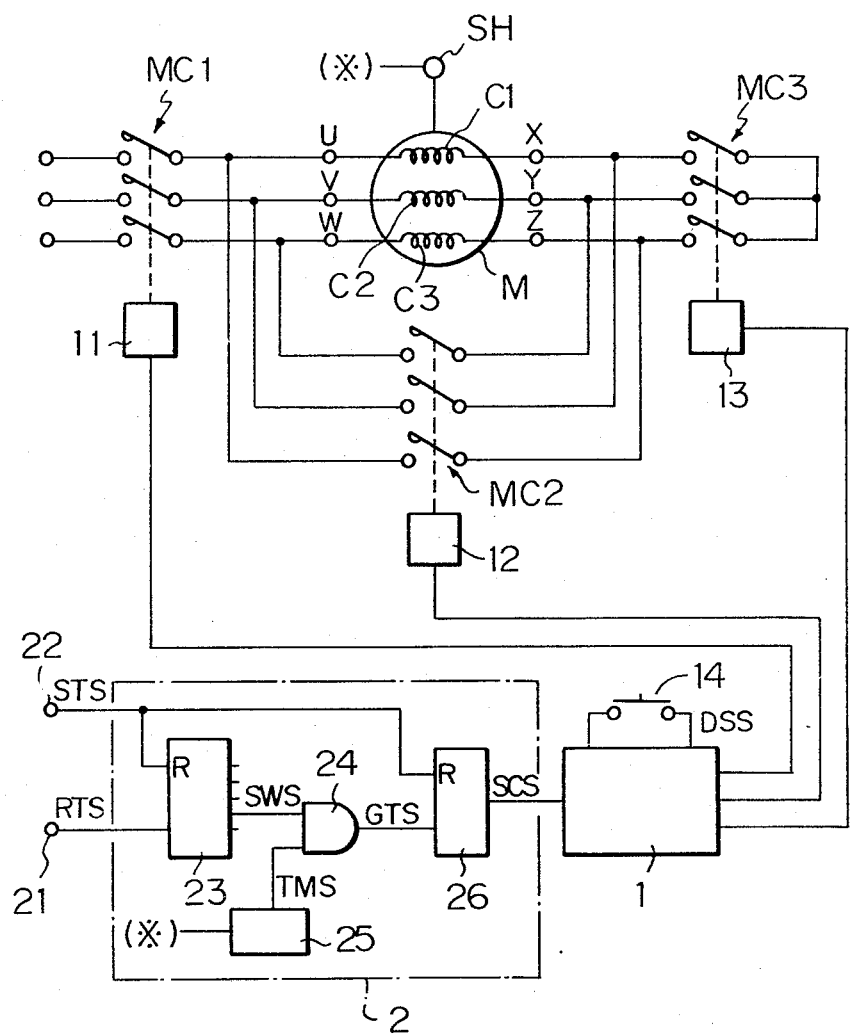
FIG. 1 is the circuit diagram of the first embodiment of the apparatus in accordance with the present invention.

One embodiment of the apparatus in accordance with the present invention is shown in FIG. 1, in which change in connection between delta and star is used for change in voltage. A drive motor M for a loom includes a primary winding made up of three stator coils C1 to C3. The first stator coil C1 is provided with a pair of opposite chips U and X, the second stator coil C2 a pair of opposite chips V and Y, and the third stator coil C3 a pair of opposite chips W and Z Electric power is supplied from a given electric power source (not shown) via electromagnetic switchs MC1 to MC3.

More specifically, the first chips U, V and W of the stator coils C1 to C3 are connected to the electric power source via the first electromagnetic switch MC1. These first chips U, V and W are connected to the second chips X, Y and Z of the stator coils C1 to C3 via the second electromagnetic switch MC2 so that closure of the second electromagnetic switch MC2 should establish short circuits between the first chips U, V and W and the second chips X, Y and Z, respectively. One terminals of the third electromagnetic switch MC3 are connected to the second chips X, Y and Z of the stator coils C1 to C3 whereas the other terminals of the third electromagnetic switch MC3 are connected to each other so that closure of the third electromagnetic switch MC3 should establish a short circuit between the second chips X, Y and Z of the stator coils C1 to C3.

Operations of the electromagnetic switches MC1 to MC3 are controlled by a control circuit 1 and a switching controller 2 connected in series to the control circuit 1.

The control circuit 1 includes several relays and contacts operationally connected to actuators 11~13 of the electromagnetic switches MC1 to MC3 in a known manner, and is accompanied with a manual start switch 14. On depression of the start switch 14, a drive start signal DSS is put in the control circuit 1.

The switching controller 2 is provided with a pair of input terminals 21 and 22. The first input terminal 21 is receptive of a rotational signal RTS which takes the form of a high level pulse issued once per one rotation of the loom whereas the second input terminal 22 is receptive of a stop signal STS on every stoppage of the loom.

The first input terminal 21 is connected to one input terminal of a switching selector 23 which is given in the form of, for example, a digital counter. One of the output terminals of the switching selector 23 is connected to one input terminal of an AND-gate 24. In the case of the illustrated embodiment, an output terminal corresponding to a count value "4" is chosen for this connection. The other input terminal of the AND-gate 24 is connected to a pulse generator 25 which is operationally related to the crank shaft SH of the loom driven for rotation by the drive motor M. The operational relationship between the pulse generator 25 and the crank shaft SH is designed so that the pulse generator 25 should issue a switch timing signal TMS in the form of a high level pulse once per one rotation of the loom at a preselected moment other than the moment of beating on the cloth-fell. For example, when beating takes place at 360° crank angle, the moment of signal generation is preferably taken within a period from 100° to 180° crank angle. The output terminal of the AND-gate 24 is connected to one terminal of a memory circuit 26. The second input terminal 22 of the switching controller 2 is connected to reset terminals R of the switching selector 23 and the memory circuit 26. The memory circuit 26 preferably takes the form of an RS-type flip-flop whose set terminal is connected to the AND-gate 24. The output terminal of the memory circuit 26 is connected to the input terminal of the control circuit 1.

Operation of the apparatus shown in FIG. 1 will now be explained in detail, reference being made mainly to FIG. 2.

Figure 3A:
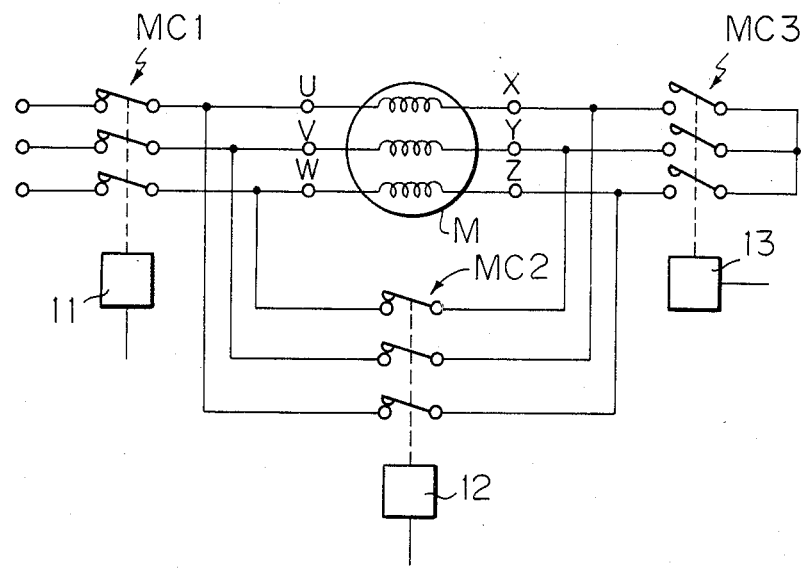
Figure 3B:
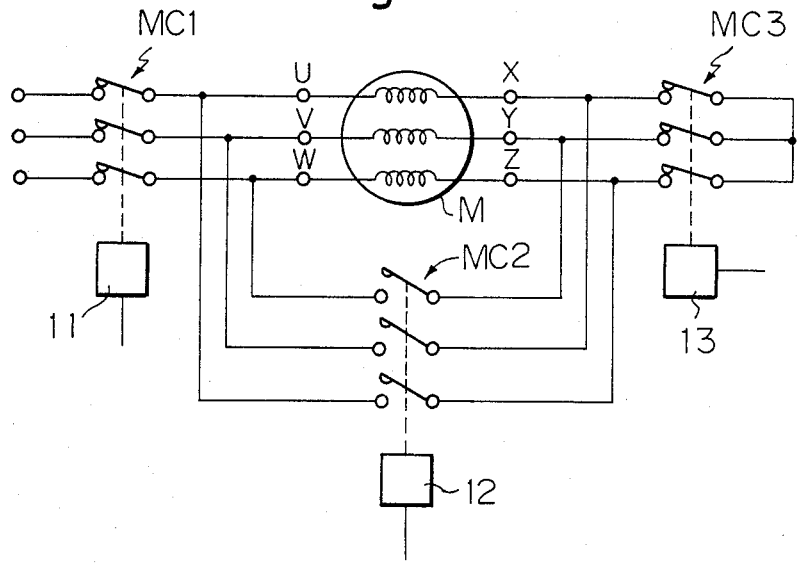

On manual depression of the start switch 14 at a moment t0, a drive start signal DSS is put in the control circuit 1 which thereupon activates the actuators 11 and 17 in order to close the first and second electromagnetic switchs MC1 and MC2. As a consequence, a delta connection is established in the drive motor M as shown in FIG. 3A and a voltage higher than the rated voltage is applied to the drive motor M which then provides larger torque for beating. As the time goes on, the drive motor M is fastly accelerated and its speed approaches the normal running speed.

It is now assumed that the drive motor M has reached its normal running speed within an initial transition period P and beating has been repeated four times during this transition period P. Since the pulse generator 25 issues one switch timing signal TMS per one rotation of the loom, i.e. the crank shaft SH at a proper moment other than the moment of beating, four switch timing signals TMS are put in the AND-gate 24 during the transition period P. Concurrently with this process, the switching selector 23 receives one rotation signal RTS per one rotation of the loom, i.e. the crank shaft SH. When four rotation signals RTS have been received during the transition period P, the switching selector 23 issues one switching SWS which lasts until the fifth beating.

On receipt of the fifth switch timing signal from the pulse generator 25 at a moment t1 after the initial transition period P, the AND-gate 24 issues one gate signal GTS which causes the memory circuit 26 to issue one switching command signal SCS. On receipt of the switching command signal SCS at the moment t1, the control circuit 1 on one hand activates the third actuator 13 in order to close the third electromagnetic switch MC3 and, on the other hand, deactivates the second actuator 12 in order to open the second electromagnetic switch MC2. As a consequence, a star connection is established in the drive motor M and the rated voltage is applied to the drive motor M which then provides smaller torque for beating.

In the way described, change in voltage is carried out in the case of the illustrated embodiment through switching from delta to star connection. In connection with this, it should be appreciated that switching of connection, i.e. change in torque provided by the drive motor M, is carried out at the moment t1 at which the switch timing signal TMS is issued by the pulse generator 25, and that each switch timing signal TMS is generated at a preselected moment other than the moment of beating on the cloth-fell. Such a moment for switching of connection should be put after completion of the preceding beating but well before the succeeding beating, more preferably just after completion of the proceding beating.

Thus, the drive motor M is driven for normal rotation with application of the rated voltage in star connection. When the loom is stopped at a moment tZ, a stop signal STS appears at the second input terminal 22 of the switching controller 2 and the switching selector 23 and the memory circuit 26 are both reset. Due to resultant absence of the signal from the control circuit 1, the first and third actuators 11 and 13 are deactivated in order to open the first and third electromagnet switchs MC1 and MC3 and the entire system resumes the condition shown in FIG. 1 whilst standing by for next running of the loom.

The length of the initial transition period P can be changed freely depending on the actual process condition. For example, when the drive motor M reaches its normal running speed within three crank cycles and three switch timing signals TMS are issued by the pulse generator 25 within the initial transition period P, an output terminal of the switching selector 23 corresponding to a count value "3" should be connected to the AND-gate 24.

In the case of the foregoing embodiment, the switching selector 23 is given in the form of a digital counter which issues an output signal, switching signal SWS, when counted up. In a modified embodiment of the present invention, the switching selector 23 may take the form of a timer which issues a switching signal SWS at the end of the initial transition period P.

Further, in the case of the foregoing embodiment, change in torque provided by a drive motor M is effected through switching of connection in the drive motor M with the electric power source voltage being unchanged. In accordance with the second embodiment of the present invention, however, similar change in torque provided by a drive motor M may be effected through switching of voltage to be applied to the primary winding of the drive motor, with the connection in the drive motor M being unchanged.

Figure 4:
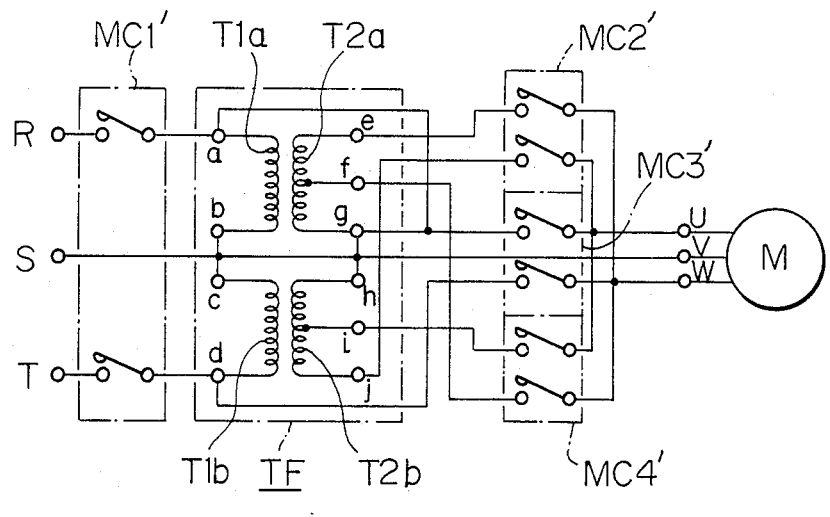
FIG. 4 is the circuit diagram of the second embodiment of the apparatus in accordance with the present invention.

Such an alternative embodiment is shown in FIG. 4, in which a drive motor M for a loom is connected to a given electric power source via a transformer TF and four electromagnetic switches MC1' to MC4'. Though omitted in the illustration, these switches MC1' to MC4' are connected, via associated actuators, to the control circuit 1 and the switching controller 2 such as shown in FIG. 1, and controlled in their closing and opening substantially in a same manner.

The transformer TF includes primary coils T1a and T1b and secondary winding coils T2a and T2b. The first primary coil T1a has a pair of end terminals a and b whereas the second primary coil T1b has a pair of end terminals c and d. The primary end terminals a and d are connected, via the first electromagnetic switch MC1', to the R- and T-shape terminals of the three phase electric power source whereas the primary end terminals b and c are both directly connected to the S-phase terminal of the electric power source. The first secondary coil T2a has a pair of end terminals e amd g whereas the second secondary coil T2b has a pair of end terminals h and j. The secondary coils T2a and T2b are further provided with intermediate terminals f and i, respectively. The secondary end terminals g and h are both connected directly to the S-phase terminal of the electric power source.

One terminals of the electromagnetic switchs MC240 to MC4' are connected to chips U and W of the drive motor M and the remaining chip V of the drive motor M is connected to the S-phase terminal of the electric power source. The other terminals of the second electromagnetic switch MC2' are connected to the secondary and terminals e and j of the first and second secondary coils T2a and T2b, the other terminals of the fourth electromagnetic switch MC4' are connected to the secondary intermediate terminals f and i of the first and second secondary coils T2a and T2b, and the other terminals of the third electromagnetic switch MC3' are connected to the primary end terminals a and d of the first and second primary coils T1a and T1b.

The number of turns for the secondary coils T2a and T2b is designed layer than that for the primary coils T1a and T1b. As a consequence, when the secondary end terminals e and j are connected to the chips U and W of the drive motor M, the voltage applied to the drive motor M is higher than the electric power source voltage.

The position of the taps on the secondary coils T2a and T2b for the secondary intermediate terminals f and i is selected so that the number of turns for the section between the terminals f and g and for the section between the terminals h and i should be smaller than that for the section between the terminals a and b and for the section between the terminals c and d. As a consequence, when the secondary intermidiate terminals f and i are connected to the chips U and W of the drive motor, the voltage applied to the drive motor is lower than the electric power source voltage.

Further, when the primary end terminals a and d of the first and second primary coils T1a and T1b are connected to the chips U and W of the drive motor M, the voltage applied to the drive motor M is equal to the electric power source voltage.

The above-described three different connections of the transfomer TF to the drive motor M are summarized as follows;

| Terminals in the transformer TF | Chips in the drive motor M | Voltage to the drive motor M |
|---|---|---|
| e, j | U, W | higher |
| a, d | U, W | power source voltage |
| f, i | U, W | lower |

The apparatus shown in FIG. 4 operates as follows under control by the control circuit 1 shown in FIG. 1.

Figure 5A:
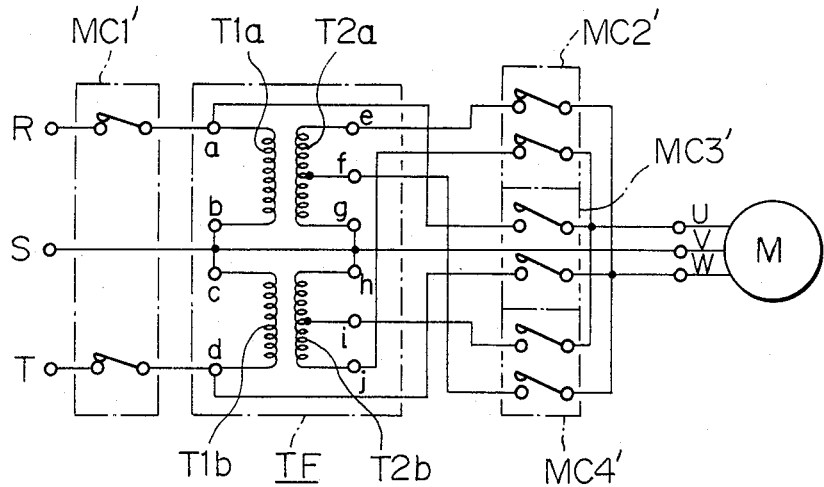
FIGS. 5A and 5C are circuit diagrams for showing the operation of the apparatus shown in FIG. 1.

When the first and second electromagnetic switchs MC1' and MC2' are closed by operation of the control circuit 1, the apparatus assumes the condition shown in FIG. 5A in which the end terminals e and j of the first and second secondary coils T2a and T2b are connected to the chips U and W of the drive motor M and the voltage applied to the drive motor M is higher than the power source voltage. When the first and third electromagnetic switchs MC1' and MC3' are closed by operation of the control circuit 1, the apparatus assumes the condition shown in FIG. 5B in which the end terminals a and d of the first and second primary coils T1a and T1b are connected to the chips U and W of the drive motor M and the voltage applied to the drive motor M is equal to the power source voltage. When the fourth electromagnetic switch MC4' is closed by operation of the control circuit 1, the apparatus assumes the condition shown in FIG. 5C in which the intermediate terminals f and i of the first and second secondary coils T2a and T2b are connected to the chips U and W of the drive motor M and the voltage applied to the drive motor M is lower than the power source voltage.

Figure 5B:
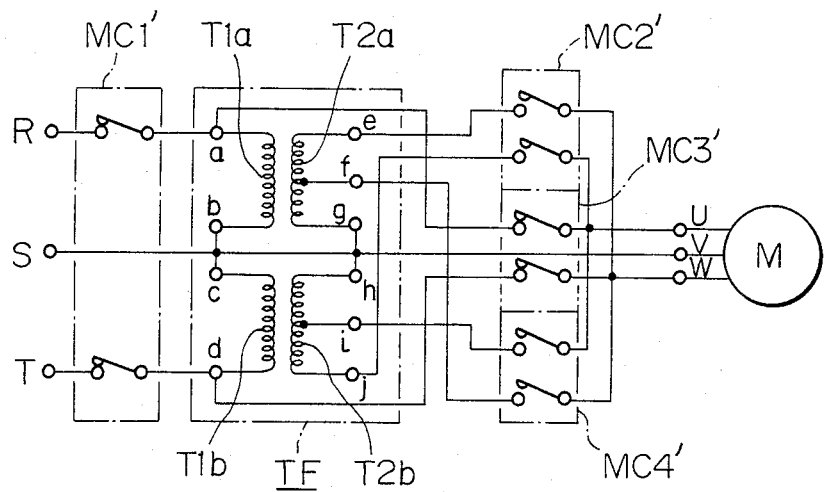
Figure 5C:
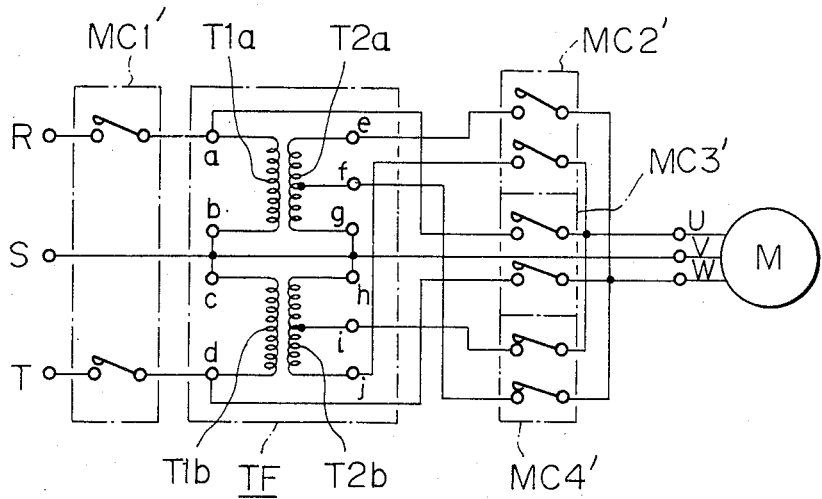

Various combinations of the conditions shown in FIGS. 5A to 5C are employable in order to effect the change in torque in accordance with the present invention. However, when the possibility of inching operation is taken into consideration in which the drive motor M is expected to provide a torque smaller than that under the normal running condition, it is most recommended to make use of the all conditions shown in FIGS. 5A to 5C. In this case, an electric power source whose voltage is equal to the rated voltage of the drive motor M is chosen for use and the control circuit 1 is provided, in addition to the start switch 14, with a manually operable inching switch.

More specifically, the operation starts from the condition shown in FIG. 5A. That is, on manual depression of the start switch 1 at the moment t0 in FIG. 2, one drive start signal DSS is put in the control circuit 1 which then closes the first and second electro-magnetic switchs MC1' and MC2' as shown in FIG. 5A. Thus, the drive motor M is driven for acceleration up to its normal running speed under application of a voltage higher than its rated voltage in order to provide larger torque during the initial transition period P.

At the end of the initial transition period P, the switching selector 23 issues one switching signal SWS which is passed to the AND-gate 24. On receipt of one gate signal GTS at the moment t1, the memory circuit 26 issues one switching command signal SCS which makes the control circuit 1 open the second electromagnetic switch MC2' and close the third electromagnetic switch MC3' as shown in FIG. 5B. Thus, the drive motor M is driven for normal running under application of a voltage equal to the rated voltage in order to provide normal torque for the normal running of the loom.

Stoppage of the loom is prerequisite to practice of the inching operation. At stoppage of the loom, a stop signal STS appears at the second input terminal of the switching controller 2 shown in FIG. 1 in order to reset the switching selector 23 and the memory circuit 26. As a consequence the apparatus resumes the condition shown in FIG. 4. On manual depression of the inching switch, one inching signal is put in the control circuit 1 which then closes the fourth electromagnetic switch MC4' as shown in FIG. 5C. Thus, the drive motor is driven for running under application of a voltage lower than its rated voltage in order to provide smaller torque during the inching operation.

In accordance with the present invention, a drive motor for a loom is subjected to application of a voltage higher than its rated voltage for provision of a larger torque during the starting period of the loom running, i.e. the period between the moments t0 to t1 in FIG. 2. For general electric devices, application of such a higher voltage would cause burning of the coils, troubles in the connections and waste in power consumption. In connection with this, it should be highly appreciated that, in the case of a weaving loom, the frequency of loom stoppage is significantly low and the length of the starting period is significantly short. Under normal condition of the continuous running system, a loom stops at most twice per 24 hours. When the normal running speed of a loom is 600 RPM, the length of the starting period is in a range from 0.2 to 0.4 seconds. Application of the higher voltage to the drive motor at such long intervals each over such a short period causes no troubles in practice.

We claim:
1. Method for running control of a loom having a crank shaft comprising the steps of
  subjecting the primary winding of a drive motor for said loom to the application of an initial voltage higher than its rated voltage during the starting period of loom running, and
  changing said initial voltage to said rated voltage after said starting period at a moment other than the moment of beating on the cloth-fell,
  the electric power source voltage for said drive motor being unchanged.
2. Method as claimed in claim 1 in which
  said moment of change in voltage is just after the last beating in said starting period and well before the first beating after said starting period.
3. Method as claimed in claim 2 in which
  said moment of change in voltage is in a range from 100° to 180° of rotation of said crank shaft of said loom.
4. Method as claimed in claim 1 in which
  change in voltage is effected through switching the mode of connection for said primary winding of said drive motor from delta to star.
5. Method as claimed in claim 1 in which
  change in voltage is effected through switching the mode of voltage transformation between said electric power source and said primary winding of said drive motor.
6. Apparatus for automatic running control of a loom having a crank shaft comprising
  an electric power source supplying constant power source voltage,
  a drive motor of a certain rated voltage for said loom including a primary winding,
  means interposed between said electric power source and said drive motor for changing the level of a voltage to be applied to said primary winding of said drive motor, and
  means for controlling the operation of said voltage level changing means so that said primary winding of said drive motor should be subjected to application of an initial voltage higher than said rated voltage during the starting period of loom running and said initial voltage should be changed to said rated voltage after said starting period at a moment other than the moment of beating on the cloth-fell.
7. Apparatus as claimed in claim 6 in which
  said voltage level changing means includes a first switching assembly connected to said electric power source and provided with a first actuator a second switching assembly interposed between said first switching assembly and said primary winding of said drive motor and provided with a second actuator, and a third switching assembly connected to said primary winding of said drive motor,
  said second switching assembly establishes a delta connection for said primary winding of said drive motor when closed together with said first switching assembly and said third switching assembly establishes a star connection for said primary winding of said drive motor when closed together with said first switching assembly.

8. Apparatus as claimed in claim 6 in which said voltage level changing means includes
- a first switching assembly connected to said electric power source and provided with a first actuator,
- a transformed connected to the output side of said first switching assembly and generative of a first voltage higher than said power source voltage at its first output terminals, a second voltage equal to said power source voltage at its second output terminals, and a third voltage lower than said power source voltage,
- a second switching assembly interposed between said primary winding of said drive motor and said first output terminals of said transformer, and provided with a second actuator,
- a third switching assembly interposed between said primary winding of said drive motor and said second output terminals of said transformer, and provided with a third actuator, and
- a fourth switching assembly interposed between said primary winding of said drive motor and said third output terminals of said transformer, and provided with a fourth actuator.

9. Apparatus as claimed in claim 7 or 8 in which said controlling means includes
- a control circuit connected to said actuators of said switching assemblies and provided with a start switch generative, on every manual depression, of one drive start signal, and
- a switching controller generative of a switching command signal to be passed to said control circuit, and provided with a first input terminal receptive of one rotation signal per one rotation of said loom and a second input terminal receptive of one stop signal per one stoppage of said loom,
- said switching controller being further operationally related to said crank shaft of said loom.

10. Apparatus as claimed in claim 9 in which said switching controller includes
- a switching selector having an input terminal connected to said first input terminal of said switching controller and a reset terminal connected to said second input terminal of said switching controller,
- a pulse generator operationally related to said crank shaft and generative of one switch timing signal per one rotation of said crank shaft at a moment other than the moment of beating on the cloth-fell,
- an AND-gate connected to said switching selector and said pulse generator, and
- a memory circuit having an input terminal connected to said AND-gate, a reset terminal connected to said second input terminal of said switching controller, and an output terminal connected to said control circuit.

11. Apparatus as claimed in claim 10 in which said switching selector takes the form of a digital counter.

12. Apparatus as claimed in claim 10 in which said switching selector takes the form of a timer.

* * * * *